Inventor
Theodore H. Barth

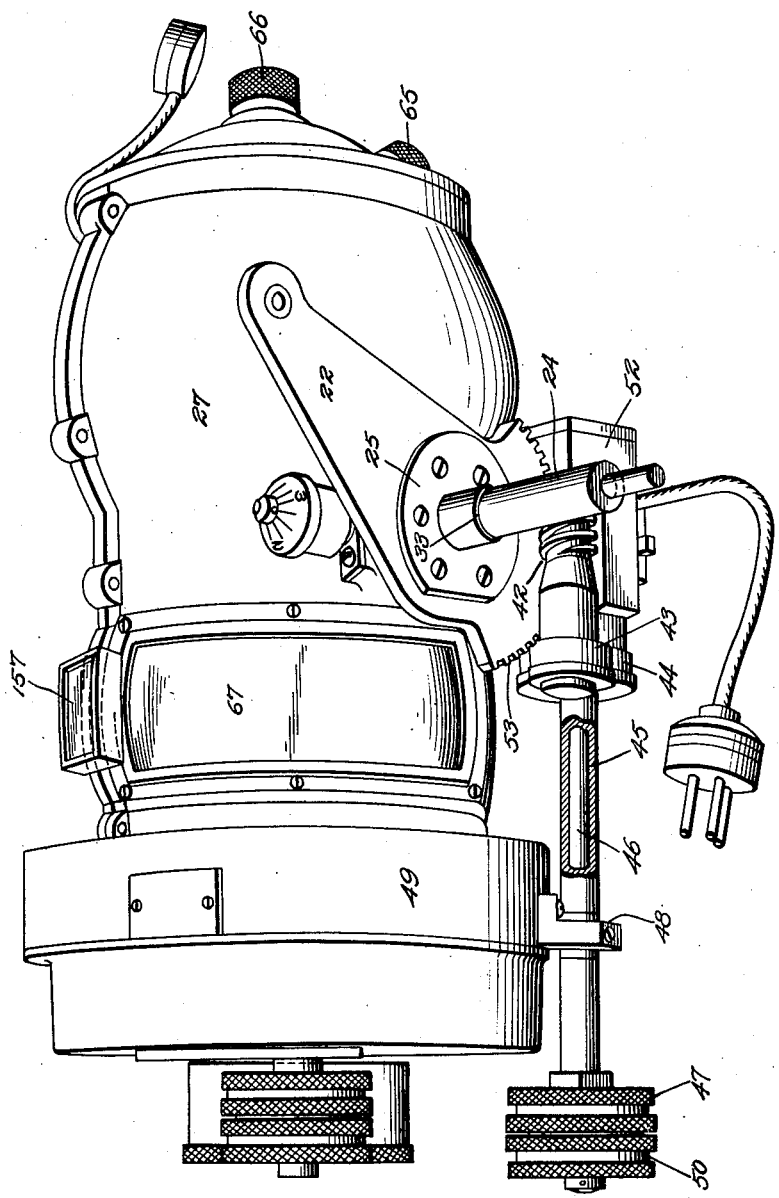

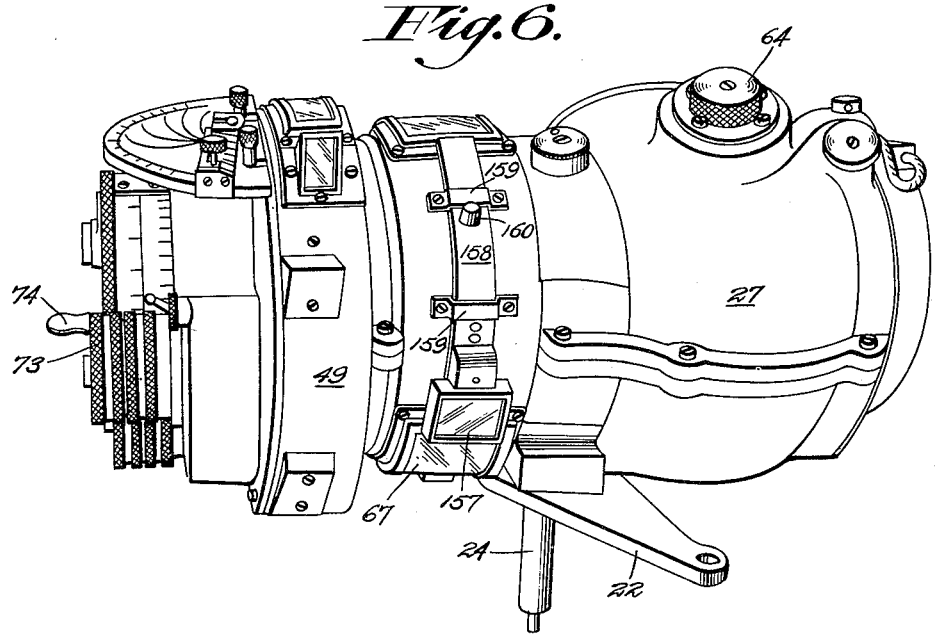
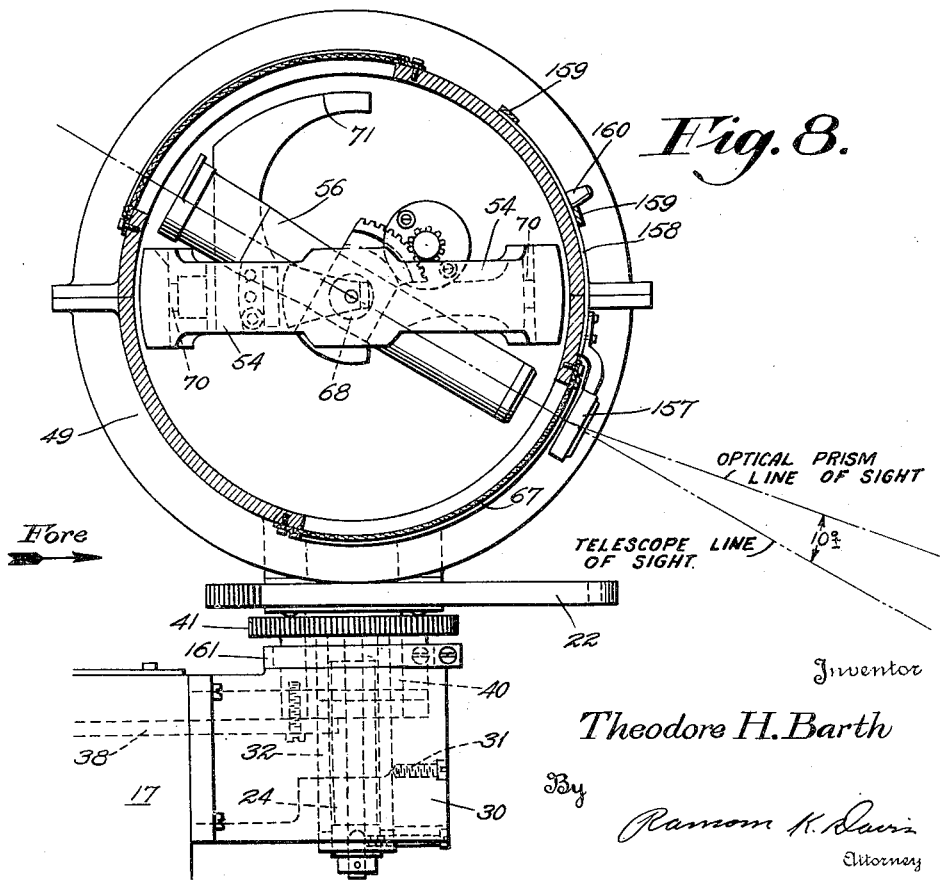

July 25, 1950

T. H. BARTH 2,516,290

LOW ALTITUDE BOMBING ATTACHMENT

Filed Oct. 16, 1939

Inventor
Theodore H. Barth

By
Ransom K. Davis
Attorney

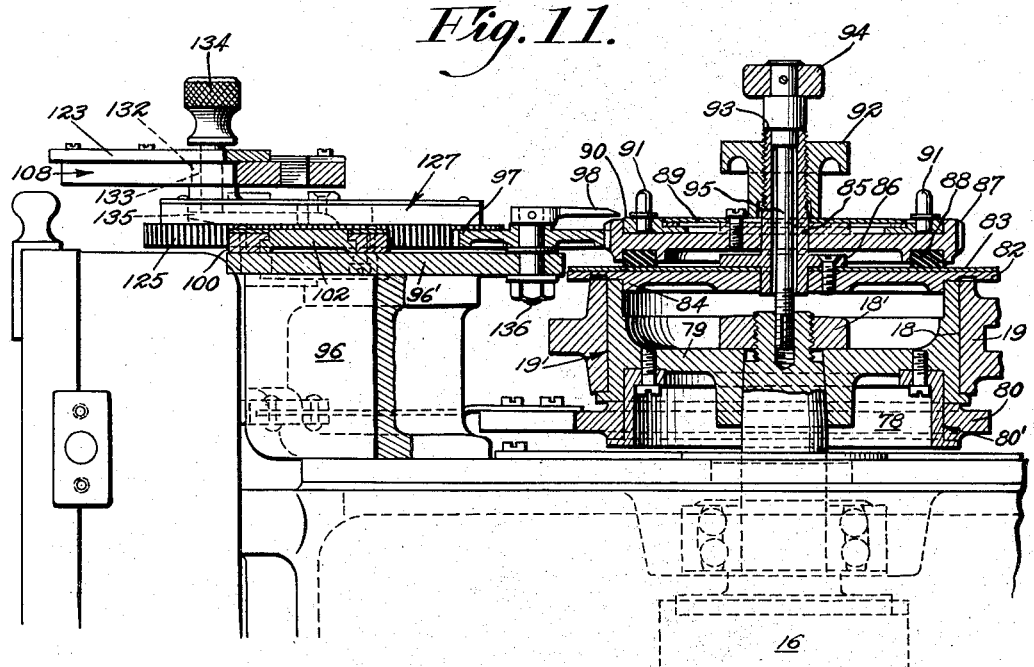
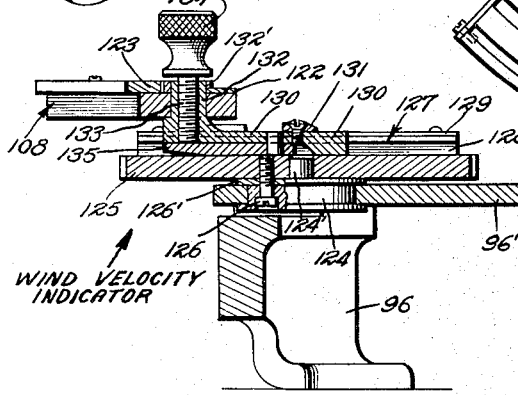
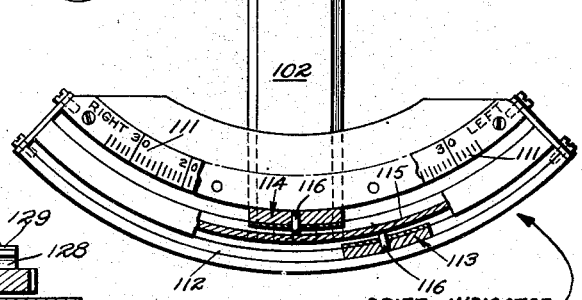
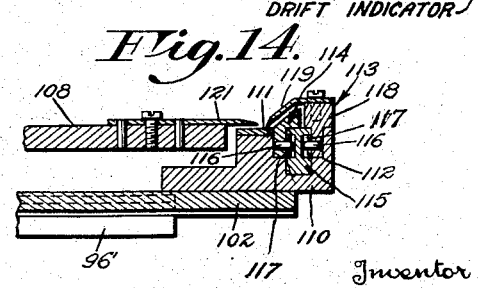

Patented July 25, 1950

2,516,290

UNITED STATES PATENT OFFICE 2,516,290

LOW ALTITUDE BOMBING ATTACHMENT

Theodore H. Barth, New York, N. Y., assignor to the United States of America as represented by the Secretary of the Navy Application October 16, 1939, Serial No. 299,771

8 Claims. (Cl. 33—46.5)

This invention relates in general to aircraft bomb sights and particularly to attachments to such.

An object of this invention is to provide attachments for a synchronized bomb sight for aircraft, such as is described in my co-pending application Serial No. 14,948, filed April 5, 1935, to adapt such bomb sight for low altitude use.

Another object of this invention is to provide attachments for a synchronized bomb sight for aircraft which may be used to determine the force and direction of the wind at any desired altitude.

Another object of this invention is to provide attachments for a synchronized bomb sight which utilize the stabilizing features of the synchronized sight and such of its control features as are adaptable for low altitude use, and for wind determination by drift methods.

The synchronizing feature of the synchronized bomb sight, described in my co-pending application Serial No. 14,948, filed April 5, 1935, and which will hereinafter be nominated as the parent bomb sight, does not permit its use at low altitudes. My new invention, known as "Low Altitude Bombing Attachments," are attachable to the parent bomb sight to permit its use at low altitudes. The low altitude bombing attachments utilize certain features of the parent bomb sight, but not its rate determination or cross-trail features, and solve for a dropping range angle for transit release of the bomb as a function of the ground speed of the aircraft.

As used throughout this specification and claims thereto appended, the term "front" refers to that side of the instrument next to the operator, and "back" refers to the opposite side thereof; "right hand" and "left hand" refer to relative positions of parts of the instrument as seen from the operator's position.

These low altitude bombing attachments comprise the (1) principal attachment, (2) the secondary operating clutch, secondary operating clutch drum, secondary connecting rod and stabilized brush collar, and (3) the wedge prism and its operating mechanism.

The principal attachment comprises essentially adjustable calibrated elements which make up the elements of the wind, ground speed, air speed triangle familiar in aerial navigation, a compass scale, various knobs and indexes for setting courses and speeds, and gearing between the basic triangle and the compass scale. The secondary operating clutch, drum, secondary connecting rod and stabilized brush collar are a means of transferring control of the stabilized brush of the parent bomb sight from the sight to the azimuth stabilizer gyro thereof. The wedge prism is an optical prism which may be inserted in the line of sight of the telescope of the parent bomb sight at will in order to bend the line of sight further ahead and permit earlier picking up of the target in the telescope.

Once the velocity and direction of the wind has been set, by means of the gearing between the compass scale and the basic triangle, the ground speed of the aircraft can be determined for any course. The compass scale can be coupled to the cardan of the azimuth stabilizer gyro of the parent bomb sight at will, and when so coupled, it operates similarly to a gyro compass. Since the range angle for dropping bombs varies with the ground speed, if a range angle predicting scale be mounted alongside the bar showing ground speed, the correct angle can be obtained for any course as soon as the navigational problem of obtaining the ground speed has been solved.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which:

Fig. 5 is a three-quarter bottom plan view of the sight member of the parent bomb sight taken from the back;

Fig. 6 is a three-quarter rear view of the sight member of the parent bomb sight taken from above, showing the method of attachment of the wedge prism and its operating mechanism;

Fig. 7 is a side view of the telescope of the parent bomb sight, assembled in the supporting cradle therefor;

Fig. 8 is a cross-sectional view through 8—8 of Fig. 2, looking from right to left, showing the wedge prism in the line of sight of the telescope;

Fig. 11 is a sectional view through 11—11 of Fig. 1, looking from front to rear;

Fig. 12 is a sectional view through 12—12 of Fig. 1, looking from front to rear;

Fig. 13 is a plan view of the drift angle scale, partly in section to show the construction of the T-bar, movable drift indicators and rollers;

Fig. 14 is an enlarged sectional view through 14—14 of Fig. 1, looking from left to right.

The synchronized bomb sight described in my co-pending application Serial No. 14,948, is not suitable for low altitude use for the following reason: At low altitudes the dropping range angles are large, frequently of the order of 50 degrees. Since the problem must be entirely solved before the dropping range angle is reached, at low altitudes the angle through which the target may be followed before release of the bomb is much less than at high altitudes. Further, the rate of change of range angle is much greater at low altitudes. The result is that the time for synchronization is greatly reduced at low altitudes and is too short to effectively solve the problem. In addition, the available angles between picking up the target and release of the bomb at low altitudes are unfavorable for an accurate solution with the synchronized sight, since at such oblique angles a relatively large aircraft travel is required for a small change of angle.

The parent bomb sight can be used for altitudes above 1,700 feet, but its adaptability decreases with altitude when it is employed at altitudes below 3,000 feet. The low altitude attachments are useful up to 3,000 feet, but are especially designed for obtaining dropping range angles between altitudes of from 700 to 1,700 feet.

Immediately following is a brief description of certain features of the parent bomb sight which are employed in connection with the operation of the low altitude bombing attachments. A more complete description of these features of the parent bomb sight is given in my co-pending application for the parent bomb sight.

Figure 3:
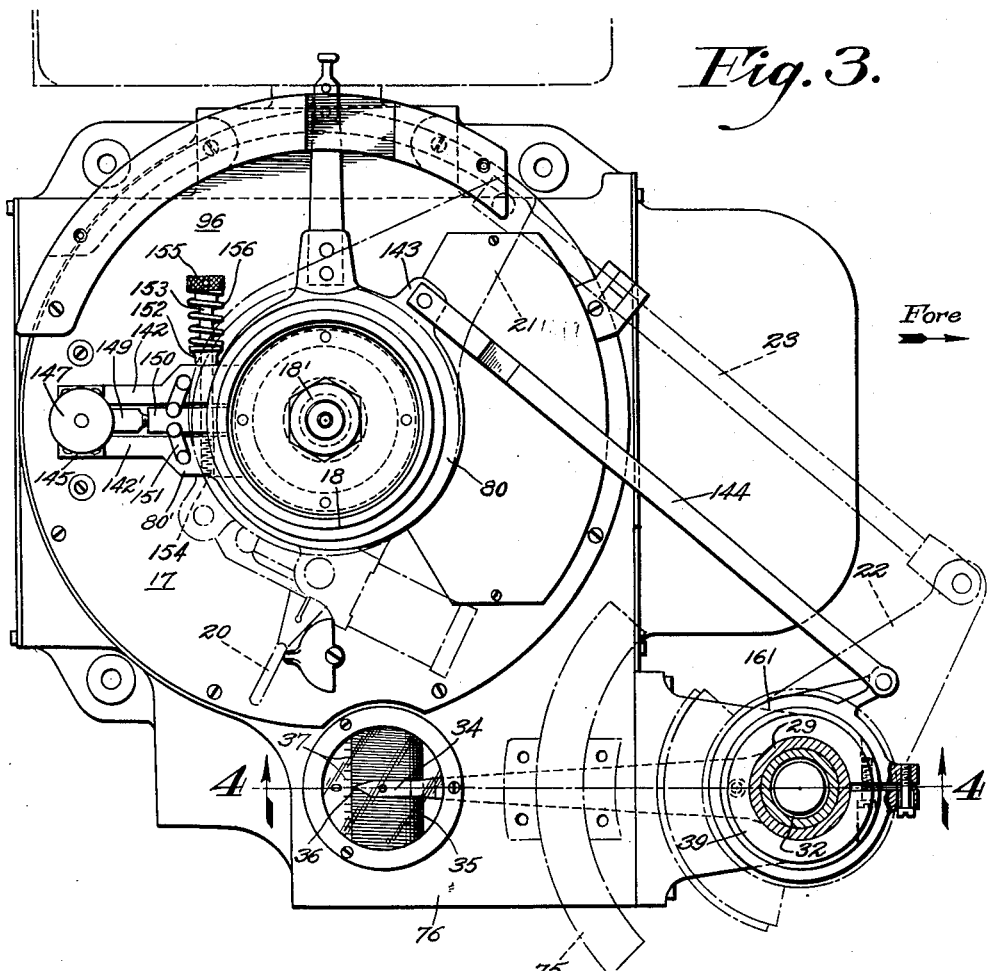
Fig. 3 is a plan view, partly in section through 3—3 of Fig. 4, of the upper casing member of the azimuth stabilizer gyro of the parent bomb sight, showing the method of attachment of the secondary operating clutch, the secondary connecting rod and the stabilized brush collar.
Figure 4:
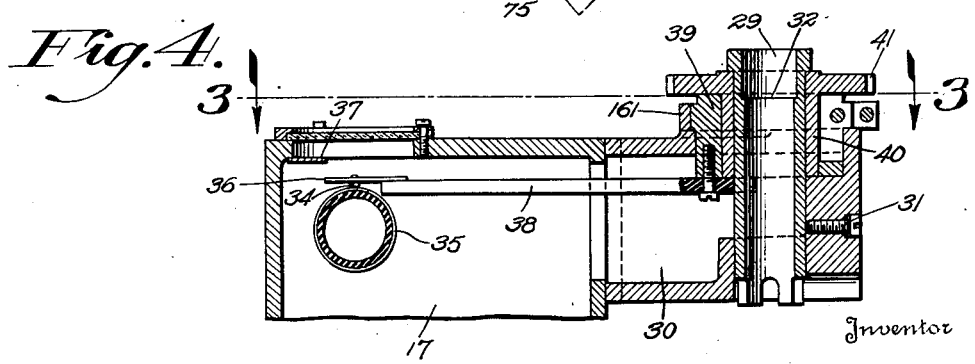
Fig. 4 is a sectional view through 4—4 of Fig. 3.

Referring to Fig. 11, the cardan 16 of the azimuth stabilizer gyro (not shown) of the parent bomb sight projects vertically upward through the upper stabilizer gyro casing 17. The axis of the azimuth stabilizer gyro 16' (Fig. 9) is substantially horizontal and, when the rotor of this gyro is spinning, tends to point to the same direction in space. The cardan 16 is attached to and controlled by the stabilizer gyro 16' and is thus stabilized in azimuth. Directional operating clutch drum 18 has a sliding taper fit around the upper end of cardan 16 and is held in place thereon by nut 18'. Directional operating clutch ring 19 clamps around drum 18 when the clutch is engaged by operating handle 20 (Fig. 3). Referring to Fig. 3, radial extension 21 from the directional operating clutch ring 19 is connected to stabilized sector 22 by a rigid link 23. Thus, when the directional operation clutch 19' is engaged, the stabilized sector 22 is stabilized in azimuth by the stabilizer gyro 16', acting through the mechanism as shown. Referring to Fig. 5, stabilized sector 22 is rotatable on the enlarged upper portion of spindle 24 and is held in position between flange 25 and a bearing strip (not shown) that lies against the bottom of sight casing member 27. Spindle 24 is rotatably mounted in a sleeve 29 (Fig. 4) secured in the azimuth stabilizer gyro casing 30 by a screw 31 and having a shoulder 32 upon which seats shoulder 33 (Fig. 5) on spindle 24.

A pilot director brush 34 (Figs. 3 and 4) is disposed to move in contact with a commutator 35 with its tip 36 adjacent to scale 37, thus indicating the deviation of the brush 34 from the fore and aft direction of the aircraft. Brush 34 is mounted on an arm 38 that is secured to member 39 in frictional engagement with sleeve 40, integral with gear 41, but when brush 34 contacts a limit stop (not shown) at either end of commutator 35, member 39 will slip on sleeve 40. A worm gear 42 (Fig. 5) meshes with gear 41 (Fig. 4) and is driven by means of gears in housings 43 and 44, the gear in the latter housing being fixed to a hollow shaft 45 that encloses shaft 46 and has a knob 47 on its outer end, shaft 45 being journaled in a bracket 48 carried by sight casing 49 in a manner to prevent longitudinal movement of shaft 45. By means of knob 47 and parts connected thereto, gear 41 may be rotated to move brush 34 (Fig. 4) over commutator 35. Worm 42 and associated members form the connection between gear 41 and the sight casing 49 such that when the sight casing 49 is rotated about its vertical axis, gear 41 rotates with it and will, in turn, cause movement of brush 34 over commutator 35. When knob 50 (Fig. 5) is turned, shaft 46 and a worm in casing 52 rotate with it, the worm meshing with teeth 53 machined in the stabilized sector 22. The stabilized sector 22 being held stabilized in azimuth by the stabilizer gyro when directional operating clutch 19' is engaged, this rotation of the worm in casing 52 rotates sight casing 27 and with it worm 42, casing 49, bracket 48, shafts 45 and 46 about a vertical axis through spindle 24, worm casing 52 being attached to sight casing 27. This movement of worm 42 rotates gear 41, thereby causing brush 34 to rotate at the same rate of movement as the sight within the limits of its possible movement. Movement of brush 34 over commutator 35 is communicated electrically to cause the needle (not shown) of a pilot director indicator (not shown) in the pilot's cockpit to indicate to the pilot when he is off the proper course and whether he is off to the right or left. When knobs 47 and 50 are turned simultaneously at the same time, brush 34 moves 5.2 times as fast as the sight casing members 27 and 49 for over-correction in order to bring the aircraft more quickly to the proper course.

Figure 2:
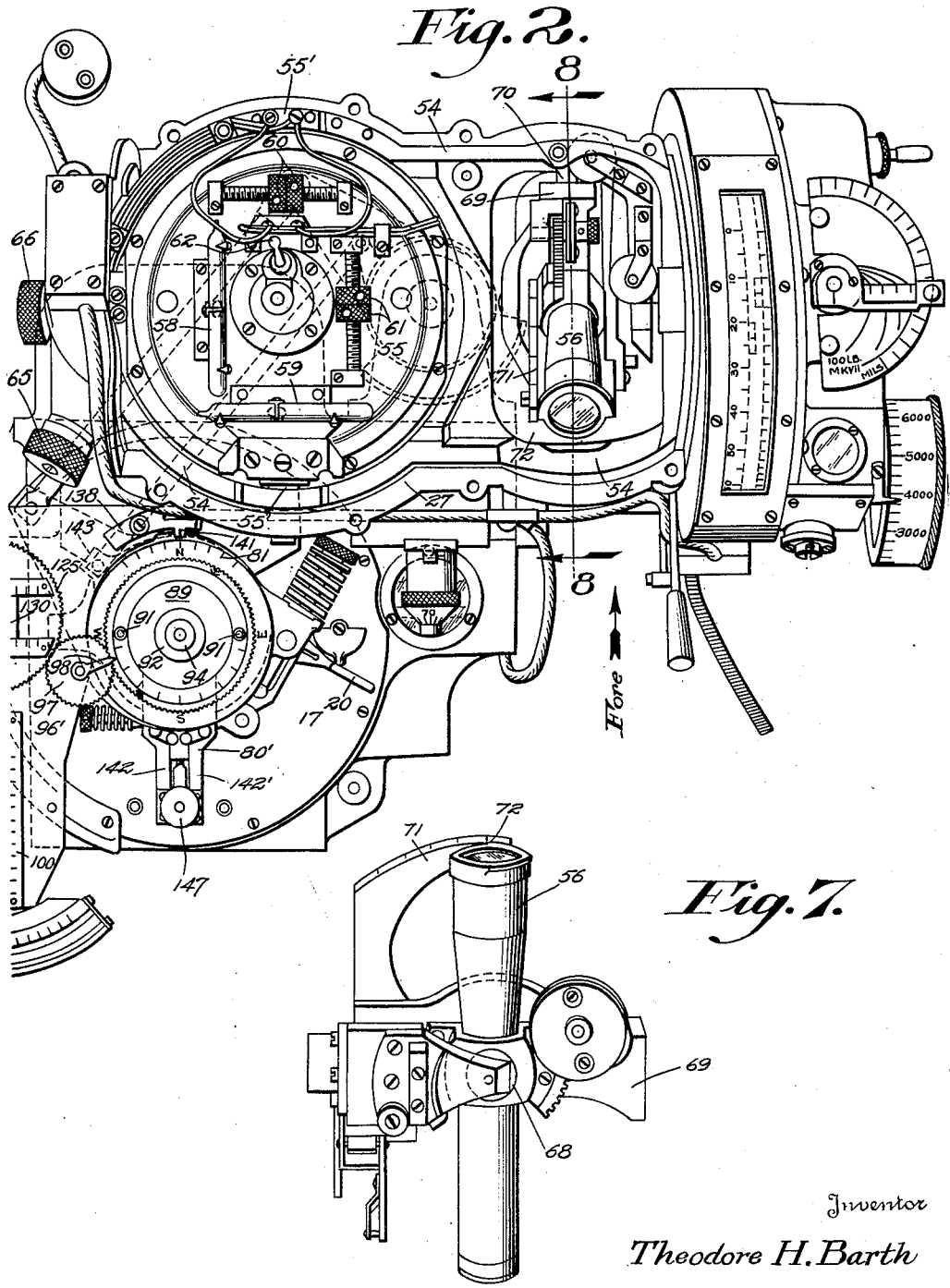
Fig. 2 is a plan view of the parent bomb sight with the upper casing of the sight member removed.

Referring to Figs. 2, 7 and 8, pivotally mounted in anti-friction bearings at the ends of the lower sight casing member 27 is the normally athwartship cardan 54, in one end of which is mounted the sight stabilizing gyro 55 upon trunnions 55' that lie at right angles to the cardan bearings, the spin axis of gyro 55 being vertical to provide a stable vertical for the sight telescope 56 that is also mounted in cardan 54. Upon the upper surface of the casing of gyro 55 are fore-and-aft level 58 and athwartship level 59, movable weights 60 and 61 for statically balancing gyro 55, and a forwardly and upwardly inclined pin 62 adapted to be engaged by a long slidable sleeve (not shown) to which locking knob 64 (Fig. 6) is attached, to lock gyro 55 against movement when not in use. Knobs 65 and 66 are slidable toward and away from casing member 27 and are connected to friction rollers (not shown) which, when the knobs are pushed in and rotated, will tilt gyro 55 athwartships and fore-and-aft, respectively, to level the gyro. Window 67 (Fig. 5) is provided adjacent the exit lens of the sight telescope 56 to permit an unobstructed line of sight from the telescope to the target for any position of the telescope within its range of movement. Telescope 56 is rotatable in bearings 68 (Fig. 7) carried by cradle 69 that is mounted on trunnions 70 (Fig. 2) carried by cardan 54, whereby cradle 69, carrying the telescope, may rock athwartships, and telescope 56 may be rotated in a fore-and-aft plane independently of stabilized cardan 54. The angular position of telescope 56 with respect to the vertical in a fore-and-aft plane is indicated on calibrated scale 71 opposite index mark 72 at the ocular end of the telescope. Telescope 56 has both a horizontal and a vertical cross mark at right angles to each other etched on a lens therein. Telescope 56 is moved in a fore-and-aft plane by displacement knob 73 (Fig. 6) which has a finger knob 74 thereon for rapid erection of the telescope. Cradle 69 carrying telescope 56 may be rocked athwartships by movement of athwartships leveling knob 65 (Fig. 2).

Figure 1:
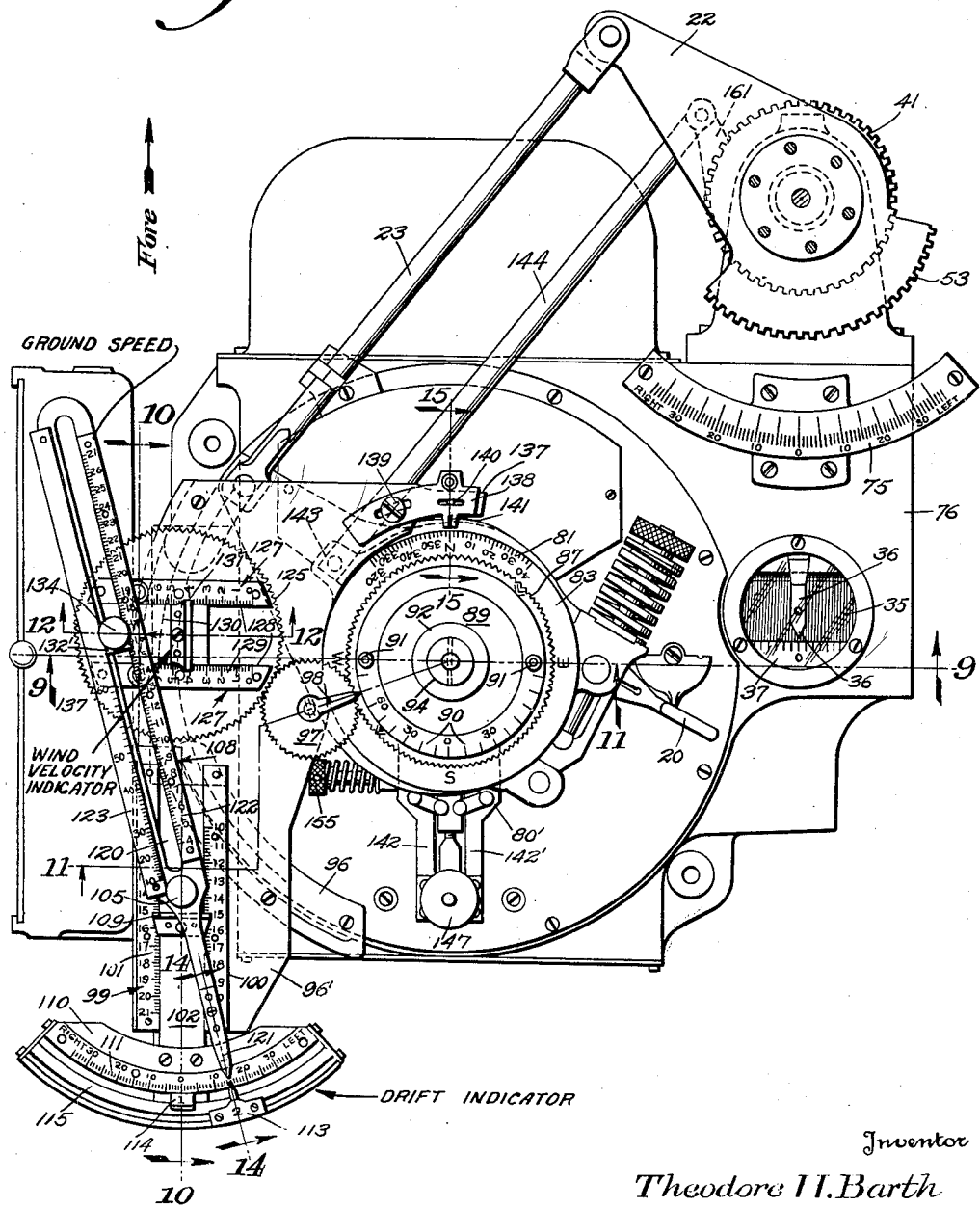
Fig. 1 is a plan view showing the principal attachment, the secondary operating clutch, the secondary connecting rod and the stabilized brush collar mounted in place on the azimuth stabilizer gyro housing of the parent bomb sight.

Referring to Figs. 1 and 3, a scale 75, calibrated in degrees to the right and left of a central zero mark, is secured to casing 76 over the stabilized brush mechanism. This scale 75 is positioned athwartships such that a line parallel to the longitudinal axis of the aircraft passes through its mid-zero mark. An index (not shown) attached to sight casing 27, indicates the angular displacement of the sight to the right or left of the longitudinal axis of the aircraft.

Figure 9:
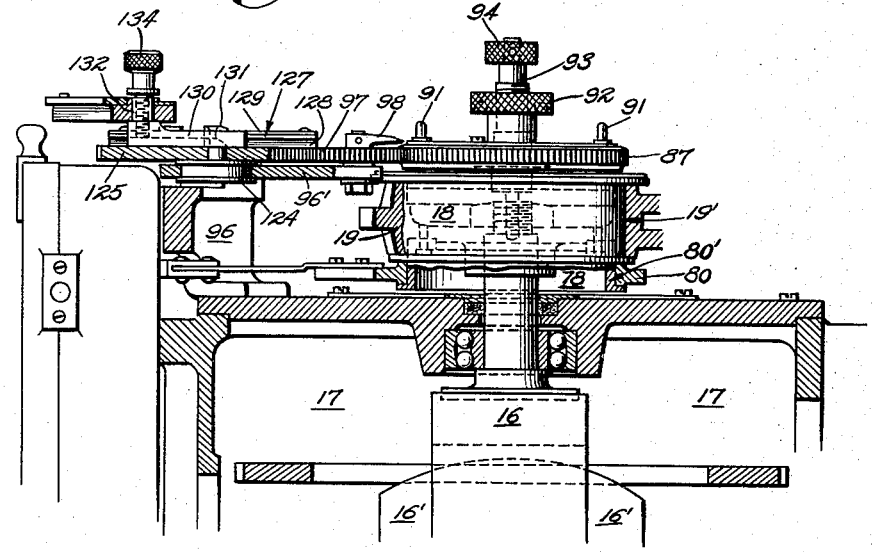
Fig. 9 is a cross-sectional view through 9—9 of Fig. 1, looking from front to rear.

The foregoing description refers to certain features of the parent bomb sight which are employed in connection with the operation of the low altitude bombing attachments. The low altitude bombing attachments themselves are described in the following paragraphs:

Referring to Figs. 9 and 11, secondary operating clutch drum 78 is attached to the web 79 of directional operating clutch drum 18. Secondary operating clutch ring 80 clamps around drum 78 when the secondary operating clutch 80' is engaged. A compass scale comprising a circular metal supporting plate 82 and a thin supported disc 83, the latter calibrated in degrees from 0 to 359, rests on the top of drum 18, with an integral perpendicularly extending cylindrical projection 84 from plate 82 a smooth slidable fit inside drum 18. A sleeve 85, threaded externally at its upper end and with an integral radially extending flange 86 near its lower end, fits in a central hole in compass scale 81, with flange 86 resting on the top of compass scale 81 and attached thereto by screws. Wind gear 87 has a central circular opening which fits around the unthreaded portion of sleeve 85 above flange 86. An annular member 88 of hard rubber is a press fit in a circular groove in the lower face of wind gear 87 and bears on the top of compass scale 81 when the wind gear is clamped against the compass scale 81. Wind gear 87 has the head and tail of an arrow, 180 degrees apart, engraved on its upper face near its periphery as an index to set wind direction. Annular movable scale 90 is a sliding fit in a depression in the upper face of wind gear 87 and is held in place by disc 89, secured to wind gear 87. Rounded-topped pins 91 are provided to rotate movable scale 90 by hand. Movable scale 90 is calibrated in 10 degree increments over 160 degrees of arc, 0 to 80 degrees on each side of a mid-zero mark. A knob 92, threaded internally, clamps wind gear 87 against compass scale 81 when screwed down around sleeve 85. A shoulder 93 of coupling knob 94 bears against the upper end of sleeve 85 as rod 95, threaded at its lower end and integral with knob 94, is screwed into a threaded hole in the upper end of stabilizer gyro cardan 16, clamping compass scale 81 to drum 18.

Figure 10:
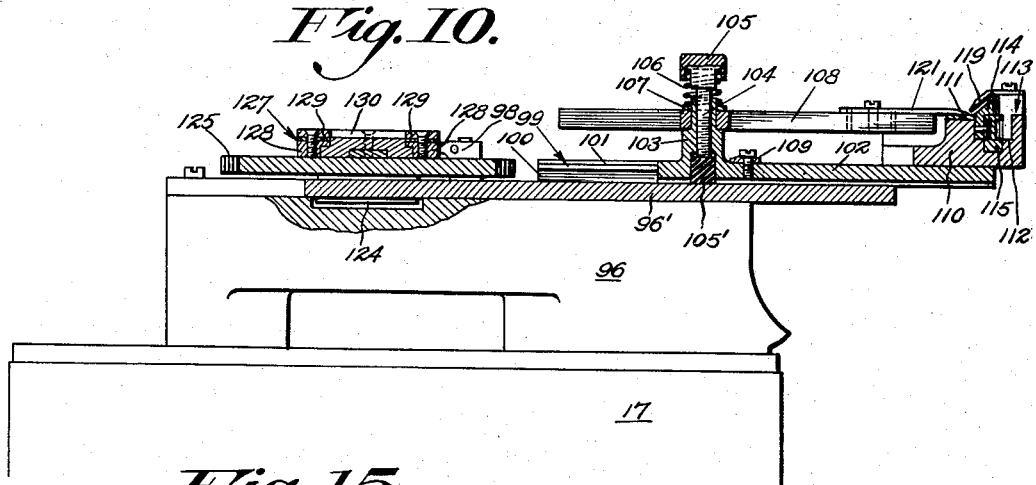
Fig. 10 is a cross-sectional view through 10—10 of Fig. 1, looking from left to right.

Mounting bracket 96 is secured to the top of gyro housing 17 and supports base plate 96'. Base plate 96' in turn supports the elements of the wind, ground speed, air speed triangle, the idler pinion 97 and fixed indicator 98. Referring to Figs. 10 and 11, fixed air speed arm 99 comprises a pair of inverted L-shaped bars 100 mounted upon and directly secured to base plate 96', with a scale 101, calibrated in air speed, secured to the top of each bar 100. Air speed indicator bar 102 is a smooth, sliding fit between the two inverted L-shaped bars of the air speed arm 99, and may be moved back and forth in a direction parallel to the longitudinal axis of L-shaped bars 100 as necessary. Integral with air speed indicator bar 102 (Fig. 10) is a short perpendicular cylindrical extension 103, drilled and threaded internally to receive air speed locking screw 104. Knob 105 is fabricated integral with air speed locking screw. When screwed down, the lower end of locking screw 104 bears against a block 105' of hard rubber which fits in a groove in the lower face of air speed indicator bar 102. A helical spring 106 fits around locking screw 104 under knob 105 and bears against a washer 107 which encircles the upper reduced diameter portion of cylindrical extension 104 and rests upon movable ground speed arm 108. Index 109 is secured by a screw and a pair of centering pins to air speed indicator bar 102. At the front end of air speed indicator bar 102 is attached arc-shaped block 110 (Figs. 10 and 14) on top of which arc-shaped drift angle scale 111 (Fig. 1) is secured, and in the upper face of which is machined a longitudinal slot 112 wherein slide movable drift angle indicators 113 and 114. The lower horizontal portion of an arc-shaped I-bar 115 is a tight fit in the lower central portion of longitudinal slot 112. Plates 117 are secured to movable drift indicators 113 and 114 by pins 116, are a sliding fit between the horizontal webs of I-bar 115, and hold the movable drift indicators in place. Movable drift indicator 113 comprises a T-shaped slider 118 with a bent pointer 119 attached thereto on the top of the T, pointer 119 being disposed adjacent to scale 111. Movable drift indicator 114 is shaped to slide under the bent pointer 119 of drift indicator 113 and has an index mark inscribed thereon adjacent to scale 111. Ground speed arm 108 has a longitudinal through slot 120 (Fig. 1) along the greater portion of its length. The slotted length of ground speed arm 108 is widened, and where the width narrows near its front end, ground speed arm 108 is drilled for a smooth rotating fit around the upper reduced diameter portion of the cylindrical extension 103 from air speed indicator bar 102 (Fig. 10). Drift angle pointer 121 is secured by a screw and a pair of centering pins to the front end of ground speed arm 108 and extends beyond, adjacent to arc shaped drift angle scale 111. A scale 122 (Fig. 1), calibrated in ground speed, is detachably secured on the right-hand side of slot 120 to the upper face of ground speed arm 108, and range angle scale 123 is likewise detachably secured on the left-hand side of slot 120. Each range angle scale 123 is calibrated for two altitudes and one air speed for one type of bomb.

Referring to Figs. 9 and 12, a circular disc 124 with an integral vertical cylindrical extension 124' and an integral radial flange in conjunction with its lower face is a rotatable fit in a circular opening in base plate 96'. Wind disc 125 is drilled centrally, fits around cylindrical extension 124' of disc 124, is separated from the upper face of disc 124 by a washer 126', and is secured to disc 124 by screw 126. Wind disc 125, disc 124, washer 126' and screw 126 thus rotate as a unit. A depression is provided in mounting bracket 96 for the flange of disc 124. Gear teeth machined in the rim of wind disc 125 mesh with idler pinion 97.

Wind arm 127 (Fig. 1) of the wind, air speed, ground speed triangle comprises a pair of inverted L-shaped parallel members 128 (Figs. 10 and 12) secured to the upper face of wind disc 125 and symmetrically disposed about a diameter thereof, with a scale 129 calibrated in wind speed secured to the top of each bar 128. Wind bar 130 is a smooth sliding fit between inverted L-shaped members 128 and may be moved back and forth longitudinally as desired. An arrow which indicates the direction of the wind relative to the longitudinal axis of the aircraft is engraved on wind bar 130. Index 131 is attached by a screw and two pins transversely across wind bar 130. Wind bar 130 has an integral perpendicular cylindrical projection 132 (Figs. 9 and 12) which connects the wind arm 127 to the ground speed arm 108, this projection 132 being drilled and threaded internally to receive wind bar lock screw 133 which is turned by integral knob 134. Cylindrical projection 132 is a sliding fit in the through longitudinal slot 120 in ground speed arm 108. When wind bar lock knob 134 and screw 133 are screwed down, lock screw 133 bears against a rectangular segment 135 of bearing metal which, in turn, bears against the upper surface of wind disc 125. This locks wind bar 130 in place on wind arm 127, but cylindrical projection 132 is still free to slide longitudinally in slot 120 in the ground speed bar 108 due to clearance maintained between knob 134 and wind disc 125. Segment 135 of bearing metal fits freely in a longitudinal slot in wind bar 130, with the end segment 135 furthest from locking screw 133 secured to wind bar 130 by a pin. The other end of segment 135 is rounded where it comes into contact with wind disc 125. Index 132' (Fig. 1), secured to cylindrical projection 132, is disposed adjacent to scales 122 and 123.

Figure 15:
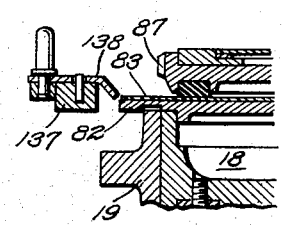
Fig. 15 is an enlarged sectional view through 15—15 of Fig. 1, looking from left to right.

Idler pinion 97 (Fig. 11) rotates about a shaft 136 which extends vertically upward from and is rigidly secured to base plate 96'. Idler pinion 97 meshes with both wind gear 87 and wind disc 125. Fixed indicator 98 is secured to shaft 136 above pinion 97. A lubber's line bracket 137 (Fig. 15) is mounted on base plate 96' and supports adjustable lubber's line plate 138, which is secured to bracket 137 by screw 139 and pin 140 (Fig. 1). Longitudinal slots are provided in plate 138 to permit adjustment. A lubber's line 141 (Fig. 1) is inscribed on plate 138, adjacent to compass scale 81.

Referring to Figs. 1 and 3, secondary operating clutch ring 80 does not completely encircle drum 78 but terminates in a pair of parallel radially extending arms 142 and 142'. Integral with clutch ring 80 is a radial projection 143 to which secondary connecting rod 144 is attached by a cotter keyed pin. A rectangular plate 145 is attached across the free ends of parallel arms 142 and 142' by four screws, and is drilled to receive an eccentric shaft (not shown). Secondary clutch operating knob 147 is fixedly secured to this eccentric shaft at its upper end. The lower end of this eccentric shaft is terminated in a horizontal eccentric cam (not shown). This eccentric cam bears against the butt end of adjustable push rod 149, the other end of which is reduced in diameter, threaded, and screwed into crosshead 150. A pair of rigid links 151 connect crosshead 150 to clutch operating arms 142 and 142', and are free to rotate horizontally about the pins which hold them in place. Clutch arms 142 and 142' are fabricated both wider and thicker where they join clutch ring 80. Clutch arm 142' has a short, horizontal, transverse cylindrical extension 152. Cylindrical extension 152 and clutch arms 142 and 142' are drilled transversely to receive clutch spring adjusting rod 153. The transverse drilled hole in clutch arm 142' is tapped. Clutch spring adjusting rod 153 is a smooth, sliding fit in the drilled hole (not shown) in clutch arm 142 and the right-hand end is threaded and screwed into the tapped hole in clutch arm 142'. The left-hand end of clutch spring adjusting rod 153 terminates in a knob 155. A helical spring 156 fits between knob 155 and cylindrical extension 152 and around clutch spring adjusting rod 153. As clutch spring adjusting knob 155 is screwed into tapped hole 154 in clutch arm 142' by knob 155, spring 156 is compressed and acts to force clutch arms 142 and 142' together, thus clamping clutch ring 80 around drum 78 (Fig. 11). To release the secondary clutch, knob 147 is rotated until the eccentric cam forces push rod 149 toward the center of drum 78. This movement is transmitted to crosshead 150 which, by means of links 151 forces clutch arms 142 and 142' apart against spring 156. The rear end of secondary connecting rod 144 is attached to adjustable stabilized brush collar 161 which is in frictional engagement around member 39 (Figs. 3 and 4) of the parent bomb sight. The stabilized brush collar 161 will slip around member 39 when brush 34 contacts a stop at either end of commutator 35.

The directional clutch, secondary operating clutch and stabilized brush collar are set to slip at the following pulls:

|  | Pounds |
|---|---|
| Directional operating clutch | 12 to 20 |
| Secondary operating clutch | 10 to 14 |
| Stabilized brush collar | 6 to 8 |

Referring to Figs. 6 and 8, a wedge prism 157 is provided which may be inserted at will in the line of sight of telescope 56 when the telescope is displaced at its maximum angle ahead of the vertical. Wedge prism 157, when so inserted, bends the line of sight 10 degrees further ahead of the vertical, and thus permits earlier picking up of the target in the telescope. Wedge prism 157 is supported by slide 158, guided and held by brackets 159. A knob 160, secured to slide 158, is useful not only to move the wedge prism 157, but also as an open sight for preliminary work with the bomb sight.

*Operation for low altitude bombing*

In the operation of this device for bombing, transit release of bombs, which is the method ordinarily employed, requires that the telescope 56 be set to the proper dropping range angle for the correct altitude, ground speed, indicated air speed and type of bomb being used. The dropping range angle varies with the ground speed for any given altitude, air speed and type of bomb. The low altitude bombing attachments permit the determination of the dropping range angle after the true wind at the bombing altitude is known and has been set in the mechanism. The true wind can be obtained from astrological observations, navigational facilities, or by using the attachments for finding the wind in the manner later described herein. After the true wind at the bombing altitude has been set into the mechanism, the attachments will indicate the ground speed for any true course that the aircraft is steering.

The normal sequence of operations in using these attachments for low altitude bombing is as follows, assuming the wind force and direction at the bombing altitude known: Energize the electrical circuits of the sight stabilizing gyro 55, the azimuth stabilizer gyro 16' and the pilot direction indicator mechanism of the parent bomb sight. Make sure the trail arm is set on zero and that the telescope rate motor is not started, as these devices of the parent bomb sight are not used in connection with the low altitude bombing attachments. Attach the proper range angle scale 123 in place on ground speed arm 108 (Fig. 1). Set the known wind direction at the bombing altitude by placing the tail of the arrow on the wind gear 87 opposite the proper degree mark on compass scale 81. Lock wind gear 87 to compass scale 81 by coupling knob 92. Set the known wind force by sliding wind bar 130 until index 131 is opposite the proper graduation on wind arm 127. Lock wind bar 130 to wind disc 125 by wind bar lock knob 134. Set telescope 56 at its maximum forward angle. Slide the wedge prism 157 in the line of sight of telescope 56 to give greater forward vision. The target can now be picked up in the telescope when it is 80 degrees forward of the vertical. Engagement of wedge prism 157 may be deferred if it is desired to use knob 160 as an open sight. Set indicated air speed by sliding air speed indicator bar 192 until index 109 is opposite the proper graduation on scales 191. The attachments have been designed to compensate for the normal differential between indicated air speeds and true air speeds at the various altitudes. After the target is sighted, direct the pilot to head toward it. Center the stabilized sector 22 by matching pointer 36 with the zero mark on scale 37 (Fig. 1). Engage the directional operating clutch 19' around drum 18. This couples the parent bomb sight to the stabilizer gyro cardan 16 and stabilizes the parent bomb sight in azimuth. Set the true heading of the aircraft on compass scale 81 opposite movable lubber's line 141 (Fig. 1), and couple the compass scale 81 to the stabilizer cardan 16 by means of coupling knob 94 (Fig. 11). Unlock the sight stabilizing gyro 55 by releasing locking knob 64 which disengages sleeve from locking pin 62. Set the sight stabilizing gyro 55 to the vertical by centering bubbles in levels 58 and 59 (Fig. 2) by the use of knobs 65 and 66. Direct the pilot to the collision course, by moving knobs 47 and 50 together in the same direction until the etched cross marks in the sight telescope stay on the target. This movement of both knobs 47 and 50 directs the sight on the target and sets a drift angle. Each time either knob 47 or 50 is rotated, stabilized brush 34 is moved over commutator 35, thus causing the pilot director indicator needle of the pilot direction indicator in the pilot's cockpit to move, thus indicating to the pilot that a change of course is necessary in order to again center the needle. When on the bombing course, obtain correct dropping range angle opposite index 132' on range angle scale 123. Rotate displacement knob 73 (Fig. 6) moving telescope 56 in a fore and aft plane until index 72 is opposite the proper dropping range angle on scale 71 inside the sight. Slide the wedge prism 157 (Figs. 6 and 8) out of the line of sight when the target passes below the athwartships cross mark in the telescope 56. Target will then be visible in the upper part of the field of the telescope above the athwartships cross line, since the telescope has a field of 20 degrees. Release the bomb manually when the target crosses the athwartships cross mark of the telescope.

It will be noted that when bombing it is only necessary to bring the aircraft to a collision course with the target, obtain the range angle from the attachments, set the sight telescope to this angle and release the bomb when the telescope horizontal cross mark crosses the target.

The aircraft can be brought to an approximate collision course by use of the open sight, and to an accurate collision course after the target can be picked up in the telescope. The range angle obtained opposite index 132' on scale 123 is correct for that collision course and altitude. If a subsequent change of target course or speed occurs, or if a subsequent change of the aircraft course or speed is necessary for any reason, it is only necessary to bring the aircraft to a new collision course, read the new range angle, and re-set the telescope.

It is easily possible to reach a collision course with the target during the interval between the time when the target is sighted and the dropping range angle is reached, even at very low altitudes. In addition, it is nearly always possible to reach a new collision course and obtain a new dropping range angle if the target should make subsequent changes of course or speed, provided such do not occur immediately before the dropping range angle is reached.

Once the attachments are set and clamped, it is not necessary to re-set for any subsequent changes of the aircraft course.

*Operation for wind determination*

Energize the parent bomb sight electrical circuits and unlock and level the sight gyro 55, as in bombing. Engage the directional operating clutch 19'. Set the true heading of the aircraft on the compass scale 81 opposite lubber's line 141, and couple the compass scale 81 to the stabilizer cardan by means of knob 94. Assume a base course midway between two drift courses. The two drift courses should, preferably, be about 60 degrees apart. Rotate secondary operating clutch 80' right or left, as necessary, to bring the aircraft on the first drift course and then engage the secondary operating clutch. This movement of the secondary operating clutch 80' moves the stabilized brush 34 over commutator 35, which, in turn, indicates on the pilot's direction indicator the direction in which the pilot must turn to center the needle thereof. When the secondary operating clutch 80' is engaged, the needle of the pilot's direction indicator remains centered only as long as the aircraft remains on the set course, otherwise the needle moves off on one side or the other of the center, depending on which side of the set drift course the aircraft is headed. Now, by rotating knob 50, rotate sight casing 27 and with it telescope 56 to the object below being used for drift determination. This movement of knob 50 would, if the secondary operating clutch 80' were not engaged, cause the stabilized brush 34 and also the needle of the pilot direction indicator to move, but stabilized brush collar 161 is more tightly frictionally engaged to member 39 (Fig. 4) than member 39 is to sleeve 40, so slippage occurs between sleeve 40 and member 39, and the stabilized brush 34 is not moved. After the sight is trained so that the telescope cross marks follow the object below being used for drift determination, the first drift angle, right or left, may be read on scale 75 (Fig. 1) opposite the index on sight casing 27. After obtaining the first drift angle, disengage both the directional operating and the secondary operating clutches. By means of the secondary operating clutch, bring the aircraft to the second drift course and then clamp the secondary operating clutch. When the secondary operating clutch 80' is moved through a large angle it will be necessary to move it in increments to the new drift course, as too great a movement would cause the stabilized brush 34 to contact one of its stops at the end of the commutator 35, and when this occurs any further movement of the clutch will merely cause slippage between the member 39 and collar 161. Of course, if the secondary operating clutch 80' is moved sufficiently slowly that the pilot can "follow" with the aircraft, it may be moved through a considerable angle in one movement. After the aircraft is steady on the second drift course, engage the directional operating clutch 19', and by the use of the turn knob 50, again train the cross marks of the sight telescope on the object below being used for drift determination and obtain a drift angle for the second drift course, in the same manner that the drift angle for the first drift course was obtained. The drift angle obtained on the first drift course will hereinafter be nominated the first drift angle; that obtained on the second drift course will be termed the second drift angle.

Having determined a drift angle on each of two drift courses, to determine the wind force and direction from the low altitude bombing attachments, proceed as follows: Set and clamp indicated air speed on air speed arm 99 (Figs. 1 and 11). Set base course on compass scale 81 opposite movable lubber's line 141 and clamp compass scale 81 to drum 18 by knob 94. Set and clamp approximate wind force on wind arm 127. Move drift indicator 114 along scale 111 to the right or left to the value of the first drift angle, depending on whether this angle is right or left. Similarly, set drift indicator 113 to the right or left on scale 111 to the value of the second drift angle. Rotate wind gear 87 counter-clockwise if the second drift course was to the right of the first drift course, or clockwise if to the left of the first drift course, until pointer 121 on ground speed arm 108 is opposite drift indicator 114, moving in the direction of drift indicator 113. Do not lock wind gear 87 to compass scale 81. Match the zero mark on movable scale 90 with fixed indicator 98. Rotate the wind gear 87 through an angle equal to the sum of the differences between the base course and each drift course, counter-clockwise if the second drift course is to the right of the first, clockwise if the second drift course is to the left of the first. When the wind force is correctly set, the pointer 121 on the ground speed arm 108 will move from opposite indicator 114 to opposite indicator 113, as wind gear 87 is rotated through the above angle. If the pointer does not move exactly as outlined above, vary the wind force set on the wind arm 127 until it does. As the wind velocity is varied, the zero mark on the movable scale 90 will, in general, have to be reset to fixed indicator 98 each time.

When the wind velocity is found, set wind gear 87 for the base course condition, i. e., rotate it in a direction opposite to that in which last moved and through an angle equal to the difference between the base course and the second drift course. Clamp wind gear 87 to compass scale 81 by knob 92. Read the wind direction on compass scale 81 opposite the tail of the arrow on the wind gear 87.

It is not, in general, necessary to fly directly over the ground object being used for drift observations, as the cradle 69 of the telescope 56 may be tilted as much as 15 degrees to either side of the vertical as necessary by means of athwartships levelling knob 65 in order to keep the telescope on the object.

It will be understood that the above description and accompanying drawings comprehend only the general and prefered embodiment of my invention and that various changes in construction, proportion and arrangement of parts may be made within the scope of the appended claims without sacrificing any of the advantages of my invention.

The invention described herein may be manufactured and/or used by or for the Government of the United States of America for governmental purposes without the payment of any royalties thereon or therefor.

I claim:

1. Attachments for adapting an aircraft synchronized bomb sight for low altitude use, said synchronized bomb sight having an azimuth stabilizer gyro cardan, a sight telescope and a member controlling a pilot direction indicator, said attachments comprising an adjustable and rotatable clutch means, a rigid link, an adjustable collar, said link connecting said clutch means to said collar, said clutch means being frictionally engageable to said cardan, said collar being frictionally engaged to said member controlling said pilot direction indicator, an adjustable calibrated air speed arm, an adjustable and rotatable calibrated ground speed arm, an adjustable and rotatable calibrated wind arm, said air speed arm, ground speed arm and wind arm being interconnected to form an adjustable triangle, at least one range angle scale attachable along said ground speed arm, a rotatable calibrated compass scale frictionlly engageable to said cardan, a rotatable calibrated wind gear concentric with said compass scale and frictionally engageable thereto; an idler pinion geared to both said wind arm and said wind gear; an annular calibrated movable scale recessed in the upper face of said wind gear and concentric therewith, an adjustable inscribed lubber's line plate disposed adjacent to said compass scale, a fixed indicator disposed adjacent to said movable scale, a curved slidable calibrated drift angle scale, at least one drift angle indicator longitudinally slidable along said drift angle scale, and a pointer fixedly secured to said ground speed arm with its tip disposed adjacent to said drift angle scale.

2. In combination with an aircraft synchronized bomb sight having an azimuth stabilizer gyro cardan, a sight telescope and a member controlling pilot direction indicator, attachments adapting said synchronized bomb sight for low altitude use, said attachments comprising an adjustable and rotatable clutch means, a rigid link, an adjustable collar, said link connecting said clutch means to said collar, said clutch means being frictionally engageable to said cardan, said collar being frictionally engaged to said member controlling said pilot direction indicator, an adjustable calibrated air speed arm, an adjustable and rotatable calibrated ground speed arm, an adjustable and rotatable calibrated wind arm, said air speed arm, ground speed arm and wind arm being interconnected to form an adjustable triangle, at least one range angle scale attachable along said ground speed arm, a rotatable calibrated compass scale frictionally engageable to said cardan, a rotatable calibrated wind gear concentric with said compass scale and frictionally engageable thereto, an idler pinion geared to both said wind arm and said wind gear, an annular calibrated movable scale recessed in the upper face of said wind gear and concentric therewith, an adjustable inscribed lubber's line plate disposed adjacent to said compass scale, a fixed indicator disposed adjacent to said movable scale, a curved slidable calibrated drift angle scale, at least one drift angle indicator longitudinally slidable along said drift angle scale, and a pointer fixedly secured to said ground speed arm with its tip disposed adjacent to said drift angle scale.

3. Attachments for adapting an aircraft synchronized bomb sight for low altitude use, said synchronized bomb sight having an azimuth stabilizer gyro cardan, a sight telescope and a member controlling a pilot direction indicator, said attachments comprising an adjustable triangle for solving aircraft ground speed, at least one range angle scale attachable to said triangle, a slidable drift angle scale, a pointer attached to said triangle and disposed adjacent to said drift angle scale for indicating drift angles, a rotatable clutch frictionally engageable to said cardan and frictionally connected to said member controlling said pilot direction indicator, a rotatable compass scale attachable to said cardan, a wind gear concentric with said compass scale and attachable thereto, an annular movable scale concentric with said wind gear and supported thereby, an adjustable inscribed lubber's line plate disposed adjacent to said compass scale, a fixed indicator disposed adjacent to said movable scale, and an idler pinion gearing said triangle to said wind gear for maintaining the correct relationship of said wind gear to said triangle.

4. In combination with an aircraft synchronized bomb sight having an azimuth stabilizer gyro cardan, a sight telescope and a member controlling a pilot direction indicator, attachments adapting said synchronized bomb sight to low altitude use, said attachments comprising an adjustable triangle for solving aircraft ground speed, at least one range angle scale attachable to said triangle, a slidable drift angle scale, a pointer attached to said triangle and disposed adjacent to said drift angle scale for indicating drift angles, a rotatable clutch frictionally engageable to said cardan and frictionally connected to said member controlling said pilot direction indicator, a rotatable compass scale attachable to said cardan, a wind gear concentric with said compass scale and attachable thereto, an annular movable scale concentric with said wind gear and supported thereby, an adjustable inscribed lubber's line plate disposed adjacent to said compass scale, a fixed indicator disposed adjacent to said movable scale, and an idler pinion gearing said triangle to said wind gear for maintaining the correct relationship of said wind gear to said triangle.

5. Attachments adapting an aircraft synchronized bomb sight for low altitude use, said synchronized bomb sight having a casing member, an azimuth stabilizer gyro cardan, a sight telescope and a member controlling a pilot direction indicator, said attachments comprising a mounting bracket attached to said casing member, a horizontal base plate supported by said bracket, a pair of inverted L-shaped bars rigidly secured to the upper face of said base plate, a scale calibrated in air speed attached to the upper face of each said inverted L-shaped bar, an air speed indicator bar with a cross-index thereon and a vertical cylindrical extension integral therewith slidably positioned between said inverted L-shaped bars, a horizontal rotatable wind disc with gear teeth in the rim thereof journaled in said base plate, a pair of inverted L-shaped members rigidly secured to the upper face of said wind disc and symmetrically disposed about a diameter thereof, a scale calibrated in wind velocity attached to the upper face of each L-shaped member, a wind bar with a cross-index thereon and a vertical cylindrical projection integral therewith slidably disposed between said L-shaped members, a calibrated ground speed arm with a longitudinal through slot therein, one end of said ground speed arm being rotatably connected to said cylindrical extension, with said cylindrical projection being slidably and rotatably disposed in said slot, a knob means for locking said wind bar in place along said inverted L-shaped members, a knob means for locking said air speed indicator bar in place along said inverted L-shaped bars, a curved calibrated drift angle scale attached to and slidable with said air speed indicator bar, a pointer fixedly secured to the end of said ground speed arm connected to said cylindrical extension with the tip of said pointer disposed adjacent to said drift angle scale, at least one movable drift angle indicator longitudinally slidable along said drift angle scale, a drum rigidly attached to said cardan, an adjustable and rotatable clutch disposed around said drum, an operating knob and an adjusting knob for said clutch, a rigid link, an adjustable collar in frictional engagement with said member of said synchronous bomb sight for controlling said pilot direction indicator, said link connecting said clutch to said collar, a horizontal rotatable compass scale, an externally threaded vertical sleeve attached to and concentric with said compass scale and passing through a central circular opening therein, a locking screw disposed within said sleeve, the lower end of said locking screw engaging said cardan and frictionally locking said compass scale to said drum when screwed down, an integral knob at the upper end of said locking screw, a rotatable horizontal wind gear supported by said compass scale and concentric therewith, an annular calibrated movable scale disposed in a recess in the upper face of said wind gear and concentric therewith, a knob engaging the external threaded portion of said sleeve to lock said wind gear to said compass scale when screwed down, a horizontal idler pinion rotatable about a fixed vertical shaft extending from said base plate and meshing with the teeth of said wind disc, an adjustable inscribed lubber's line plate disposed adjacent to said compass scale, and a fixed indicator disposed adjacent to said movable scale.

6. In combination with an aircraft synchronized bomb sight having a casing member, an azimuth stabilizer gyro cardan, a sight telescope and a member controlling a pilot direction indicator, attachments adapting said synchronized bomb sight for low altitude use, said attachments comprising a mounting bracket attached to said casing member, a horizontal base plate supported by said bracket, a pair of inverted L-shaped bars rigidly secured to the upper face of said base plate, a scale calibrated in air speed attached to the upper face of each said inverted L-shaped bar, an air speed indicator bar with a cross index thereon and a vertical cylindrical extension integral therewith slidably positioned between said inverted L-shaped bars, a horizontal rotatable wind disc with gear teeth in the rim thereof journaled in said base plate, a pair of inverted L-shaped members rigidly secured to the upper face of said wind disc and symmetrically disposed about a diameter thereof, a scale calibrated in wind velocity attached to the upper face of each L-shaped member, a wind bar with a cross index thereon and a vertical cylindrical projection integral therewith slidably disposed between said L-shaped members, a calibrated ground speed arm with a longitudinal through slot therein, one end of said ground speed arm being rotatably connected to said cylindrical extension, with said cylindrical projection being slidably and rotatably disposed in said slot, a knob means for locking said wind bar in place along said inverted L-shaped members, a knob means for locking said air speed indicator bar in place along said inverted L-shaped bars, a curved calibrated drift angle scale attached to and slidable with said air speed indicator bar, a pointer fixedly secured to the end of said ground speed arm connected to said cylindrical extension with the tip of said pointer disposed adjacent to said drift angle scale, at least one movable drift angle indicator longitudinally slidable along said drift angle scale, a drum rigidly attached to said cardan, an adjustable and rotatable clutch disposed around said drum, an operating knob and an adjusting knob for said clutch, a rigid link, an adjustable collar in frictional engagement with said member of said synchronous bomb sight for controlling said pilot direction indicator, said link connecting said clutch to said collar, a horizontal rotatable compass scale, an externally threaded vertical sleeve attached to and concentric with said compass scale and passing through a central circular opening therein, a locking screw disposed within said sleeve, the lower end of said locking screw engaging said cardan and frictionally locking said compass scale to said drum when screwed down, an integral knob at the upper end of said locking screw, a rotatable horizontal wind gear supported by said compass scale and concentric therewith, an annular calibrated movable scale disposed in a recess in the upper face of said wind gear and concentric therewith, a knob engaging the external threaded portion of said sleeve to lock said wind gear to said compass scale when screwed down, a horizontal idler pinion rotatable about a fixed vertical shaft extending from said base plate and meshing with the teeth of said wind disc, an adjustable inscribed lubber's line plate disposed adjacent to said compass scale, and a fixed indicator disposed adjacent to said movable scale.

7. Attachments adapting an aircraft synchronized bomb sight for low altitude use, said synchronized bomb sight having an azimuth stabilizer gyro cardan, a sight telescope and a member controlling a pilot direction indicator, said attachments comprising a horizontal base plate, a pair of inverted L-shaped bars rigidly secured to the upper face of said base plate, a scale calibrated in air speed attached to the upper face of each said inverted L-shaped bars, an air speed indicator bar with a cross index thereon and a vertical cylindrical extension integral therewith slidably positioned between said inverted L-shaped bars, a horizontal rotatable wind disc with gear teeth in the rim thereof journaled in said base plate, a pair of inverted L-shaped members rigidly secured to the upper face of said wind disc and symmetrically disposed about a diameter thereof, a scale calibrated in wind velocity attached to the upper face of each L-shaped member, a wind bar with a cross index thereon and a vertical cylindrical projection integral therewith slidably disposed between said L-shaped members, a calibrated ground speed arm with a longitudinal through slot therein, one end of said ground speed arm being rotatably connected to said cylindrical extension, with said cylindrical projection being slidably and rotatably disposed in said slot, a knob means for locking said wind bar in place along said inverted L-shaped members, a knob means for locking said air speed indicator bar in place along said inverted L-shaped bars, a curved calibrated drift angle scale attached to and slidable with said air speed indicator bar, a pointer fixedly secured to the end of said ground speed arm connected to said cylindrical extension with the tip of said pointer disposed adjacent to said drift angle scale, at least one movable drift angle indicator longitudinally slidable along said drift angle scale, a drum rigidly attached to said cardan, an adjustable and rotatable clutch disposed around said drum, a rigid link, an adjustable collar in frictional engagement with said member of said synchronous bomb sight for controlling said pilot direction indicator, said link connecting said clutch to said collar, a horizontal rotatable compass scale, an externally threaded vertical sleeve attached to and concentric with said compass scale and passing through a central circular opening therein, a locking screw disposed within said sleeve, the lower end of said locking screw engaging said cardan and frictionally locking said compass scale to said drum when screwed down, an integral knob at the upper end of said locking screw, a rotatable horizontal wind gear supported by said compass scale and concentric therewith, an annular calibrated movable scale disposed in a recess in the upper face of said wind gear and concentric therewith, a knob engaging the external threaded portion of said sleeve to lock said wind gear to said compass scale when screwed down, a horizontal idler pinion rotatable about a fixed vertical shaft extending from said base plate and meshing with the teeth of said wind disc, an adjustable inscribed lubber's line plate disposed adjacent to said compass scale, and a fixed indicator disposed adjacent to said movable scale.

8. In combination with an aircraft synchronized bomb sight having an azimuth stabilizer gyro cardan, a sight telescope and a member controlling a pilot direction indicator, attachments adapting said synchronized bomb sight for low altitude use, said attachments comprising a horizontal base plate, a pair of inverted L-shaped bars rigidly secured to the upper face of said base plate, a scale calibrated in air speed attached to the upper face of each said inverted L-shaped bar, an air speed indicator bar with a cross index thereon and a vertical cylindrical extension integral therewith slidably positioned between said inverted L-shaped bars, a horizontal rotatable wind disc with gear teeth in the rim thereof journaled in said base plate, a pair of inverted L-shaped members rigidly secured to the upper face of said wind disc and symmetrically disposed about a diameter thereof, a scale calibrated in wind velocity attached to the upper face of each L-shaped member, a wind bar with a cross index thereon and a vertical cylindrical projection integral therewith slidably disposed between said L-shaped members, a calibrated ground speed arm with a longitudinal through slot therein, one end of said ground speed arm being rotatably connected to said cylindrical extension, with said cylindrical projection being slidably and rotatably disposed in said slot, a knob means for locking said wind bar in place along said inverted L-shaped member, a knob means for locking said air speed indicator bar in place along said inverted L-shaped bars, a curved calibrated drift angle scale attached to and slidable with said air speed indicator bar, a pointer fixedly secured to the end of said ground speed arm connected to said cylindrical extension with the tip of said pointer disposed adjacent to said drift angle scale, at least one movable drift angle indicator longitudinally slidable along said drift angle scale, a drum rigidly attached to said cardan, an adjustable and rotatable clutch disposed around said drum, a rigid link, an adjustable collar in frictional engagement with said member of said synchronous bomb sight for controlling said pilot direction indicator, said link connecting said clutch to said collar, a horizontal rotatable compass scale, an externally threaded vertical sleeve attached to and concentric with said compass scale and passing through a central circular opening therein, a locking screw disposed within said sleeve, the lower end of said locking screw engaging said cardan and frictionally locking said compass scale to said drum when screwed down, an integral knob at the upper end of said locking screw, a rotatable horizontal wind gear supported by said compass scale and concentric therewith, an annular calibrated movable scale disposed in a recess in the upper face of said wind gear and concentric therewith, a knob engaging the external threaded portion of said sleeve to lock said wind gear to said compass scale when screwed down, a horizontal idler pinion rotatable about a fixed vertical shaft extending from said base plate and meshing with the teeth of said wind disc, an adjustable inscribed lubber's line plate disposed adjacent to said compass scale, and a fixed indicator disposed to said compass scale, and a fixed indicator disposed adjacent to said movable scale.

THEODORE H. BARTH.

REFERENCES CITED

The following references are of record in the file of this patent:

UNITED STATES PATENTS

| Number | Name | Date |
| --- | --- | --- |
| 1,314,428 | Pollen et al. | Aug. 26, 1919 |
| 1,315,065 | Wimperis | Sept. 2, 1919 |
| 1,363,011 | Pollen et al. | Dec. 21, 1920 |
| 1,383,660 | Proctor | July 5, 1921 |
| 1,784,929 | Estoppey | Dec. 16, 1930 |
| 1,942,536 | Clementi | Jan. 9, 1934 |
| 1,985,077 | Burkhardt | Dec. 18, 1934 |

FOREIGN PATENTS

| Number | Country | Date |
| --- | --- | --- |
| 145,810 | Great Britain | July 8, 1920 |